(12) United States Patent
Gruber et al.

(10) Patent No.: US 10,775,148 B2
(45) Date of Patent: Sep. 15, 2020

(54) DETERMINING A POSITION OF A MOVABLE PART OF A COORDINATE MEASURING MACHINE

(71) Applicant: CARL ZEISS INDUSTRIELLE MESSTECHNIK GMBH, Oberkochen (DE)

(72) Inventors: Udo Gruber, Pappenheim (DE); Günter Grupp, Böhmenkirch (DE); Ralf Bernhardt, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 169 days.

(21) Appl. No.: 15/729,749

(22) Filed: Oct. 11, 2017

(65) Prior Publication Data
US 2018/0106586 A1 Apr. 19, 2018

(30) Foreign Application Priority Data
Oct. 14, 2016 (DE) .......................... 10 2016 220 097

(51) Int. Cl.
*G01B 5/008* (2006.01)
*G01B 21/04* (2006.01)

(52) U.S. Cl.
CPC ........... *G01B 5/008* (2013.01); *G01B 21/045* (2013.01)

(58) Field of Classification Search
CPC ...... G01B 21/045; G01B 5/008; G01B 21/04; G01B 3/008; G01B 21/047; G01B 11/005; G01B 11/306; G01B 5/0014
(Continued)

(56) References Cited

U.S. PATENT DOCUMENTS

| 5,333,386 A | 8/1994 | Breyer et al. |
| 5,579,246 A | 11/1996 | Ebersbach et al. |

(Continued)

FOREIGN PATENT DOCUMENTS

| EP | 0537641 B1 | 4/1996 |
| EP | 0657715 B1 | 1/1999 |

(Continued)

*Primary Examiner* — Yaritza Guadalupe-McCall
(74) *Attorney, Agent, or Firm* — Harness, Dickey & Pierce, P.L.C.

(57) ABSTRACT

A coordinate measuring machine comprising a movable part, a drive and drive controller, and a position measuring system for measuring position values of the movable part. Intended values produced by the drive controller are supplied to a computational model (MOD) of a computational device. The intended values respectively predetermine an intended state of the drive. Position deviations (Δs) are formed between the measured position values (s) and position estimates of the computational model (MOD). The position estimates are produced by the computational model (MOD) for a predetermined location at the movable part. Acceleration values are measured by an acceleration sensor arranged at a location at the movable part. Acceleration deviations (Δa) are formed between the measured acceleration values (a) and acceleration estimates of the computational model (MOD). During the operation of the coordinate measuring machine, the position deviations (Δs) and the acceleration deviations (Δa) are supplied to the computational model (MOD), which outputs updated position estimates (ŝ) and updated acceleration estimates (â), accordingly. The position of the movable part is determined by the updated position estimates (ŝ).

14 Claims, 4 Drawing Sheets

(58) Field of Classification Search
USPC .......................................................... 33/503
See application file for complete search history.

(56) References Cited

U.S. PATENT DOCUMENTS

| | | | |
|---|---|---|---|
| 6,868,356 B2 | 3/2005 | Nai et al. | |
| 9,673,021 B2* | 6/2017 | Ogawa | H01J 37/20 |
| 10,401,162 B2* | 9/2019 | Lummes | |
| 2014/0222373 A1 | 8/2014 | Sprenger | |
| 2014/0249772 A1* | 9/2014 | Sprenger | G01B 5/008 |
| | | | 702/152 |
| 2016/0018207 A1* | 1/2016 | Fuchs | G01B 21/045 |
| | | | 702/95 |
| 2016/0178362 A1* | 6/2016 | Iseli | G01B 5/008 |
| | | | 33/503 |
| 2017/0370690 A1* | 12/2017 | Held | G01B 5/012 |
| 2018/0106586 A1* | 4/2018 | Gruber | G01B 21/045 |
| 2018/0252520 A1* | 9/2018 | Stott | G01B 21/045 |
| 2019/0107378 A1* | 4/2019 | Meile | G01B 21/042 |
| 2019/0195626 A1* | 6/2019 | Iseli | G01B 21/042 |

FOREIGN PATENT DOCUMENTS

| | | |
|---|---|---|
| EP | 1311799 B1 | 5/2003 |
| JP | 2015184943 A | 10/2015 |

\* cited by examiner

DETERMINING A POSITION OF A MOVABLE PART OF A COORDINATE MEASURING MACHINE

CROSS-REFERENCE TO RELATED APPLICATIONS

This application claims the priority of German patent application DE 10 2016 220 097.6, filed Oct. 14, 2016. The entire content of this application is herewith incorporated by reference.

BACKGROUND OF THE INVENTION

The invention relates to a method for determining a position of a movable part of a coordinate measuring machine and a coordinate measuring machine.

The mechanical and kinematic construction of the coordinate measuring machine (abbreviated CMM below) may differ. By way of example, this may relate to a CMM with a portal design, articulated arm design, parallel kinematic design or horizontal arm design. In all cases, the CMM has a movable part, at which a measuring sensor is fastened or coupled either directly or indirectly. Therefore, the measuring sensor is also moved by moving the movable part, in particular to bring said measuring sensor into a position and/or alignment in which a test object is measured with the aid of the sensor and in order to determine coordinates of the test object. Alternatively, or additionally, the measuring sensor can sense the test object during the movement, for example in a scanning manner. The movement of the movable part is driven by at least one drive of the CMM.

By way of example, the sensor is a measuring head mounted at a movable part (for example a quill or an arm) of the CMM. On the measuring head it is possible to mount a probe (e.g. a probe pin), in particular, using which the CMM probes the surface of the workpiece in a tactile manner. Therefore, in particular, a probe for the tactile probing of the workpiece to be measured is also an example of a sensor or of a part of the sensor. The measuring head has a sensor system, in particular, which generates measurement signals whose evaluation enables the coordinates to be determined.

However, other measuring sensors also crop up in coordinate measuring technology. By way of example, the sensor may merely initiate the measurement of the coordinates. This is the case for example for a switching measuring head which produces a switching signal upon contact with the workpiece to be measured, which switching signal initiates the measurement of the coordinates e.g. by reading off the scale or the scales of the position measuring system at the movable part or the movable parts of the CMM. In principle, the sensors can be classified into sensors that carry out measurement by contact (tactile probing of the workpiece) and sensors that do not carry out measurement by contact. By way of example, optical sensors (e.g. cameras) or capacitive sensors for coordinate measurement are sensors which are not based on the principle of tactile sensing. Moreover, it is possible to classify sensors according to the type or size of the in particular simultaneously detected region of the workpiece. In particular, sensors may measure coordinates just of a point or of an area on the surface or else in the interior of the workpiece or measure coordinates of a volume of the workpiece.

In particular, the measuring sensor can be securely connected to the movable part or to at least one of the movable parts of the coordinate measuring machine, the position of which is measured by a position measuring system of the CMM during the operation of the coordinate measuring machine. A secure connection should also be understood to mean a connection that is detachable again, said connection for example being establishable by, or consisting of, an interchange interface. As an alternative or in addition to a secure connection, there may be a movable connection, or said movable connection may be established, between the measuring sensor and at least one of the movable parts of the coordinate measuring machine. By way of example, the measuring sensor may be connected to one of the movable parts via a rotary joint with one axis of rotation or with a plurality of axes of rotation. By way of example, this movable part may be the quill of a coordinate measuring machine with a portal design or gantry design, or the horizontal arm of a coordinate measuring machine with a horizontal arm design. At least one interchange interface may also be used in the case of the movable connection. The respective interchange interface permits coupling and decoupling of the measuring sensor and/or of the rotary joint.

In particular, the movable part may be an elongate part, e.g. an arm, wherein the length of the elongate part is a multiple (e.g. at least five times or at least 10 times) of the width and depth of the elongate part. The width and depth may be measured in two mutually perpendicular directions that are perpendicular to the longitudinal direction.

Mechanical vibrations which, in particular, are excited by the at least one drive of the CMM may occur in the CMM of the aforementioned type with at least one movable part and a measuring sensor that is directly or indirectly connected or coupled to the movable part. Such vibrations also occur at the movable part to which the sensor is indirectly or directly connected or coupled. Although the position measuring system of the CMM measures the current position of the movable part, it does not, in almost all movement positions, measure the position of the region of the movable part that is connected or coupled to the measuring sensor. In almost all movement positions, the point at which the position measuring system measures the position of the movable part lies at a significant or even far distance from the region to which the measuring sensor is coupled or connected. Therefore, the position measuring system is unable to directly measure the unintended changes in the position of the region on account of vibrations.

On the other hand, the position of the region to which the measuring sensor is coupled or to which it is fastened is required for determining the position of the measuring sensor and hence also for determining the coordinates of the test object that is measured with the aid of the measuring sensor. The coordinates should be determined not only in the coordinate system of the measuring sensor but, in particular, in the coordinate system of the test object or a stationary base of the coordinate measuring machine.

By way of example, in the case of a coordinate measuring machine with a portal design (i.e. a bridge design), vibrations may occur at the lower end of the quill to which the measuring head is coupled, in the direction (denoted Y-direction as a rule) in which the entire bridge or the entire portal is displaceable. In the case of the coordinate measuring machine with a horizontal arm design, significant vibrations may occur in the direction (denoted X-direction as a rule) in which the horizontal arm is movable together with the stand that is displaceable relative to the base, in particular in the case of a greatly extended horizontal arm to which the measuring sensor is attached.

It is possible to provide an acceleration sensor, for example at the lower end of the quill or at the end of the horizontal arm, said acceleration sensor measuring the accelerations on account of vibrations in the region to which the measuring sensor is coupled or to which it is connected. The measurement values of the acceleration sensor depending on time can be integrated twice over time such that the position is obtained as a function of the location. However, this assumes that the initial value for integrating twice is known and the acceleration sensor and also integrating twice over time do not produce a significant error that falsifies the result. Trials by the inventors have yielded that, in any case, acceleration sensors which can be assembled on a CMM for permanent operation at justifiable costs do not supply sufficiently accurate determination results for the position over typical operation times of coordinate measuring machines if the effects of mechanical vibrations should also be considered. Instead, it was found that, over time, the phase and amplitude of the determination result increasingly deviate from the actual phase and amplitude of the vibration.

It is an object of the present invention to specify a method for determining a position of a movable part of a coordinate measuring machine and a coordinate measuring machine which facilitate determining the position of the movable part, even if mechanical vibrations occur at the movable part.

SUMMARY OF THE INVENTION

In accordance with the present invention, position measurement values of the movable part are measured by the position measuring system of the coordinate measuring machine. Here, the position of the movable part can be measured by the position measuring system at the movable part itself or at another movable part which, in respect of the position or position component (e.g. the position component in the Y-direction) to be measured, is moved in the same way as the movable part. By way of example, the Y-position of the movable part (e.g. of the quill of a CMM with the bridge design) can be measured at at least one of the columns of the bridge and hence also reproduces the Y-position of the quill. However, these position measurement values do not contain any deviations of the position of the quill from the position of the columns of the bridge on account of vibrations of the quill.

Further, acceleration values of the movable part are measured. As a result, mechanical vibrations of the movable part are captured in metrological fashion. In the example of the CMM with a bridge design, the acceleration sensor is situated e.g. at the lower end of the quill. In the case of a horizontal arm measuring machine, the acceleration sensor is situated e.g. at the end of the horizontal arm to which also the measuring sensor is coupled or to which the measuring sensor is connected.

Further, a computational model (e.g. implemented by computer in a controller of the CMM) of the coordinate measuring machine is used, with intended values from a drive controller or a drive regulator of the coordinate measuring machine being supplied thereto. By way of example, values of the intended rotational speed, of the intended speed or of the intended electric current of at least one drive motor are supplied to the computational model. The intended values are the intended values for operating at least one drive motor, by means of which the movement of the movable part is driven indirectly via at least one further movable part or directly. If only one position component is measured, it is possible, for example, to supply only the intended value relating to the direction of the component to the computational model, for example the intended current or the intended rotational speed of the drive motor or the drive motors which effectuate the movement of the movable part in this direction. The drive controller or drive regulator is operated with the intended values which are also supplied to the computational model. This may mean that the intended values are supplied to a further part of the drive controller or drive regulator (e.g. the intended rotational speed as an output signal of a position regulator is supplied to the rotational speed regulator or the intended current value as an output signal of a rotational speed regulator is supplied to a current regulator) and/or that the at least one drive motor is actuated in accordance with the respectively valid intended value. By way of example, an electric current that corresponds to the intended electric current is set. Here, like in any controlled or regulated system, there may be deviations between the current actual value and the current intended value.

The computational model is configured to output estimated values for the position and the acceleration. The acceleration is the acceleration at the measurement location of the acceleration sensor. The position estimates are estimates for a predetermined location at or in the movable part. The location at which the position of the movable part is measured by the position measuring system always deviates or—in the case of a measurement at the movable part itself depending on the movement position—usually deviates from the predetermined location for the position estimation. Here, the assumption is made that the position measurement location of the position measuring system, which is at a distance from the predetermined location for the position estimation, also supplies a value for the position of the movable part, said value relating or being convertible to the predetermined location for the position estimation. Therefore, there is no time-constant deviation of the position measurement value and the position estimate or said deviation is corrected. Overall, the position measurement value and the position estimate are therefore the same or convertible into one another. However, differences nevertheless occur at the predetermined location on account of mechanical vibrations which do not occur in the same way at the position measurement location. What is of importance to the invention here is that the time averages of both position values are the same over the time period of a few vibration cycles or that the time averages deviate from one another just like the position value at the predetermined location that is not afflicted by vibration and the position measurement value.

The position deviations formed from the measured position values and the position estimates of the computational model are also supplied to the computational model just like the acceleration deviations that exist between the measured acceleration values and the acceleration values that are estimated by the computational model. The computational model considers the position deviations and the acceleration deviations and outputs appropriately updated position estimates and updated acceleration estimates.

If the description makes use of the plural for the measurement values, estimates and deviations, this means that measurement values are repeatedly measured, estimates are repeatedly produced and output by the computational model and deviations between at least one measurement value and at least one estimate are repeatedly formed. In particular, a position deviation between a current position measurement value and a current position estimate can be formed in each case at a current instant of the operation of the CMM and said position deviation can be fed back to the computational model. A corresponding statement applies to the acceleration values. However, ascertaining a plurality of deviations or a deviation taking into account a plurality of measurement values and/or a plurality of estimates at a current instant is not precluded either.

In particular, the operation of the CMM using the computational model can be performed in the case of a repeated execution of the operations of the computational model in successive work cycles.

The aforementioned procedures using computational models are known, in principle, from control engineering in respect of the repeated execution of operations of the computational model, in respect of the repeated supply of input variables to the computational model and in respect of the repeated output and processing of output variables of the computational model. Therefore, the basics of control engineering, in particular in relation to so-called observers and so-called Kalman filters, are not repeated here. As a matter of principle, they are also known to a person skilled in the art in the field of coordinate metrology. By way of example, US 2016/0178362 A1 describes the compensation of the mechanical effects of vibrations of a sensor element of a coordinate measuring machine using an observer or Kalman filter, wherein, however, the sensor element therein is combined with an actuator for producing a measurement force that should be exerted by the sensor element and the actuator is actuated for damping or compensating mechanical vibrations. Distances between a position measurement location and a predetermined location for the position estimation are not considered therein and there is also no feedback of the acceleration deviations and position deviations to the computational model.

By virtue of the feedback of these deviations, the computational model can output updated estimates which take into account the vibrations of the movable part. Since there is feedback not only of the acceleration deviations but also of the position deviations, phase and amplitude differences between the actual vibrations on the one hand and the acceleration measurement values of the acceleration sensor on the other hand may be taken into account. The information provided by the position deviations to the computational model can be used to this effect, even though the position measurement location and the predetermined location for the position estimation are, as a rule, spaced apart from one another because the position measurement system does not measure at the predetermined location for the position estimation. On the other hand, the acceleration deviations contain information for the computational model which reproduces the vibration profile over a few vibration cycles. The position of the movable part at the predetermined location can therefore also be estimated by the computational model in the case of mechanical vibrations.

In particular, the following is proposed: a method for determining a position of a movable part of a coordinate measuring machine, wherein a measuring sensor of the coordinate measuring machine is moved by way of a movement of the movable part, comprising the following steps:
  supplying intended values (i.e. values of at least one controlled variable) that are produced by a drive controller or a drive regulator of the coordinate measuring machine to a computational model of the coordinate measuring machine, wherein the drive controller or drive regulator actuates at least one drive of the coordinate measuring machine in order to move the movable part or in order to move the movable part and at least one further movable part of the coordinate measuring machine and hence move the measuring sensor, and wherein the intended values predetermine an intended state of the at least one drive,
  measuring position values of the movable part by a position measuring system of the coordinate measuring machine,
  forming position deviations between the measured position values and position estimates of the computational model, wherein the position estimates are produced by the computational model for a predetermined location at or in the movable part,
  measuring acceleration values by an acceleration sensor which is arranged at an acceleration measurement location, which is a location at or in the movable part, wherein the acceleration measurement location is at a distance from a position measurement location of the position measuring system in all or most possible movement positions of the movable part and, in all or most possible movement positions of the movable part, lies closer to the predetermined location than the position measurement location of the position measuring system at which the position measuring system measures the position values of the movable part,
  forming acceleration deviations between the measured acceleration values and acceleration estimates of the computational model,
wherein the position deviations and the acceleration deviations are supplied to the computational model and, taking these into account, the computational model outputs updated position estimates and updated acceleration estimates, wherein the position of the movable part is determined by the updated position estimates.

Furthermore, the following is proposed: a coordinate measuring machine, comprising:
  a movable part,
  at least one drive for driving the movable part, directly or indirectly via at least one further movable part of the coordinate measuring machine, and hence for driving a movement of a measuring sensor for measuring coordinates of a workpiece,
  a drive controller or a drive regulator for actuating the at least one drive,
  a position measuring system for measuring position values of the movable part,
wherein the coordinate measuring machine further comprises a computational device with a computational model for computational modelling of an operation of the coordinate measuring machine and is configured to:
  supply intended values which are produced by the drive controller or the drive regulator to the computational model, wherein the intended values respectively predetermine an intended state of the at least one drive,
  form position deviations between the measured position values and position estimates of the computational model, wherein the position estimates are produced by the computational model for a predetermined location at or in the movable part,
  measure acceleration values by an acceleration sensor which is arranged at an acceleration measurement location, which is a location at or in the movable part, wherein the acceleration measurement location is at a distance from a position measurement location of the position measuring system in all or most possible movement positions of the movable part and, in all or most possible movement positions of the movable part, lies closer to the predetermined location than the position measurement location of the position measuring system at which the position measuring system measures the position values of the movable part, form acceleration deviations between the measured acceleration values and acceleration estimates of the computational model, wherein, during the operation of the coordinate measuring machine, the position deviations and the acceleration deviations are supplied to the computational model and, taking these into account, the computational model outputs updated position estimates and updated acceleration estimates, wherein the position of the movable part is determined by the updated position estimates.

In particular, scales which comprise absolute or incremental position values and/or position marks may be part of the position measuring system. By way of example, the scale may be formed at the movable part and/or be connected to the movable part. At least one position sensor of the position measuring system may be arranged at a part of the CMM, relative to which the movable part moves. This movable part may be the movable part to which the measuring sensor of the CMM is connected or to which the measuring sensor is coupled. However, the movable part with this scale may also be another movable part of the CMM, which is moved together with the movable part to which the measuring sensor is coupled or to which the measuring sensor is connected.

The predetermined location for which the computational model produces the position estimates may, in particular, be a location at one end of the movable part to which the measuring sensor is connected or to which the measuring sensor is coupled. In particular, this may be that end of the movable part at which the measuring sensor is arranged. The movable part may be an elongate part and the end may lie at the end of the elongate part in the longitudinal direction. Alternatively, or additionally, the predetermined location may be the location at which the acceleration sensor is arranged. This means that the acceleration measurement location and the predetermined location for the position estimates of the computational model are the same.

Embodiments and configurations of the method and of the coordinate measuring machine are described below.

In accordance with a configuration, coordinates of a workpiece that are measured using the measuring sensor are ascertained from the updated position estimates and from measurement values and/or signals of the measuring sensor. By way of example, in the case of a switching-type measuring sensor, the signals thereof are used for determining the coordinates. The coordinate measuring machine may be configured in accordance with the configuration of the method. In particular, the position estimates may be used immediately as position values when ascertaining the coordinates.

Alternatively or additionally, the updated position estimates and/or updated estimates of at least one further state variable (e.g. speed values of the movable part) may be supplied to the drive controller or drive regulator of the coordinate measuring machine and used by the drive controller or drive regulator when producing control signals for actuating the at least one drive. The coordinate measuring machine and the drive controller or drive regulator may be configured accordingly. In this way, the vibrations of the movable part can be damped or compensated by the control signals and the corresponding operation of the at least one drive.

In a configuration, the intended values of the drive controller or drive regulator, the position deviations and/or the acceleration deviations are supplied to the computational model with a weighting in each case such that there is a greater influence in the case of a higher set weighting and a lesser influence in the case of a lower set weighting on calculations of the computational model. The weighting or weightings is/are ascertained on the basis of a quality criterion which takes into account state variables, which describe the state of the coordinate measuring machine, and the intended values produced by the drive controller or drive regulator, respectively over the course of time during an operating time period. The coordinate measuring machine may be configured to supply the intended values, the position deviations and/or the acceleration deviations to the computational model with an adjustable weighting. Therefore, the coordinate measuring machine has an appropriate input interface, by means of which the weighting may be set. The adjustment may be undertaken automatically if the result of the application of the quality criterion is, for example, ascertained by the CMM itself and the weighting emerging therefrom is adopted automatically for the computational model.

By setting the weighting, it is possible to improve the computational model and, in particular, optimize the latter on the basis of the quality criterion. By way of example, different coordinate measuring machines have different behaviours in respect of the mechanical vibrations of the movable part. The same coordinate measuring machine may also have a different behaviour if, for example, a different measuring sensor is coupled to the movable part. An improvement in the computational model may lead to, in particular, an improved estimation of the temporal profile of the position at the predetermined location with regard to mechanical vibrations at the location.

In particular, the respective weighting with which the influence of the intended values, the position deviations and/or the acceleration deviations is set may consist of a plurality of weighting components. Each of the weighting components may set the influence on one of a plurality of state variables which describe the state of the coordinate measuring machine.

In particular, the quality criterion may supply a result which can be evaluated on the basis of a scale of a scalar variable; in particular, it is possible to ascertain whether the result lies higher or lower on the scale. In particular, the weightings considered in the quality criterion may be varied until the result of the quality criterion yields a minimum on the scale or, in an alternative embodiment, a maximum. By way of this minimization or maximization, the associated weightings that yield an optimized computational model are ascertained.

BRIEF DESCRIPTION OF THE DRAWINGS

Exemplary embodiments of the invention will now be described with reference to the attached drawing. In the individual figures of the drawing.

Figure 1:
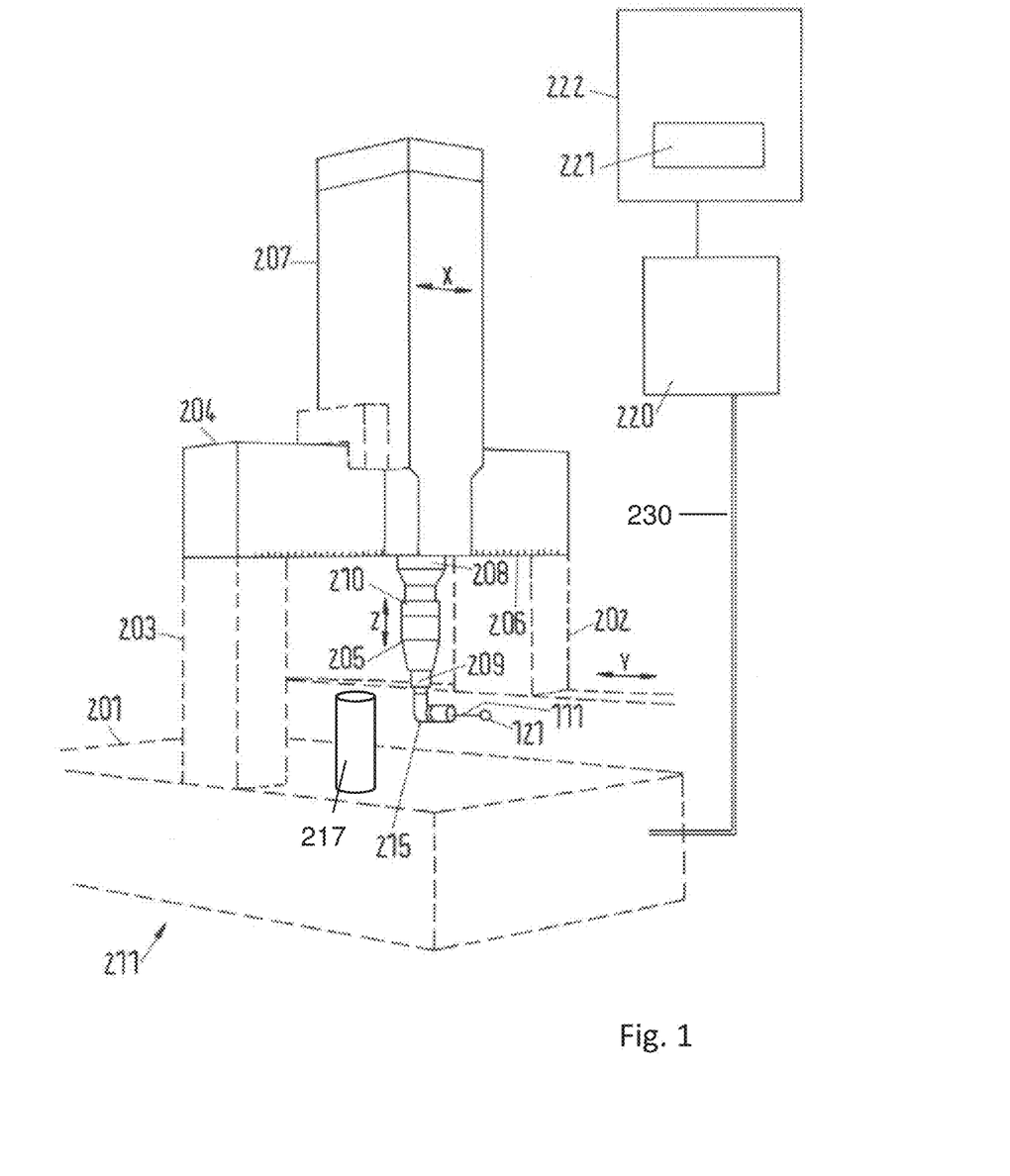
FIG. 1 shows a coordinate measuring machine with a portal design as an example for a type of coordinate measuring machine that may find use in conjunction with the present invention, FIG. 2 schematically shows a system which may, for example, relate to the coordinate measuring machine illustrated in FIG. 1, wherein a computational model, for example in the form of an approximated transfer function, is ascertained from the system, FIG. 3 schematically shows an exemplary embodiment for a computational model that is based on an observer, FIG. 4 schematically shows an exemplary embodiment for a computational model that is based on a Kalman filter, and FIG. 5 schematically shows an exemplary embodiment for a computational model with a feedback for drive regulation in order to damp or compensate mechanical vibrations.

The coordinate measuring machine (CMM) 211 with a portal design, depicted in FIG. 1, comprises a measurement table 201, above which columns 202, 203 are arranged in a manner movable in the Y-direction of a Cartesian coordinate system. Together with a crossbeam 204, the columns 202, 203 form a portal of the CMM 211. At its opposite ends, the crossbeam 204 is connected to the columns 202 and 203, respectively. Electric motors (not illustrated) as drives cause the linear movements of the columns 202, 203 and of the parts carried by the columns 202, 203 along the movement axis, which extends in the Y-direction. Here, for example, one electric motor is associated with each one of the two columns 202, 203. The crossbeam 204 is combined with a cross slide 207, which is movable, e.g. by way of air bearings, along the crossbeam 204 in the X-direction of the Cartesian coordinate system. The current position of the cross slide 207 relative to the crossbeam 204 can be determined on the basis of a scale graduation 206. The movement of the cross slide 207 along the movement axis in the X-direction is driven by at least one further electric motor as a drive (not illustrated). A quill 208, which is movable in the vertical direction, is mounted on the cross slide 207 and connected at the lower end thereof to a measuring head 205 by way of a mounting device 210. An angled, single-axis rotary joint 215 is coupled to the measuring head 205 by way of an interchange interface 209. Using the rotary joint 215, a probe pin 111 is connected to a probe sphere 121. Driven by a further electric motor (not illustrated), the rotary joint 215 may be rotated about a rotary axis of the Cartesian coordinate system that extends parallel to the Z-direction such that the probe pin is, for example, aligned in the direction of a test object 217 that stands on the measurement table 201.

Further, FIG. 1 depicts an evaluation device 220 which receives the measurement signals from the measuring head by way of a schematically depicted connection 230. A schematically depicted controller 222 of the CMM 211 actuates the drives (e.g. the aforementioned electric motors). In particular, the controller 222 is able to displace the probe pin 111 into a desired position by controlling the drives and align the probe pin 111 in a desired measuring direction.

The controller 222 is further combined with a computational device 221, or comprises the latter, in which calculations of a computation model of the CMM 211 are executed repeatedly during the operation of the CMM 211. The computational model repeatedly produces position estimates of a position of a movable part at a predetermined location, in particular at the bottom of the quill 208, wherein the position estimates also take into account mechanical vibrations at the predetermined location.

At least one acceleration sensor is arranged at the predetermined location in particular, or in the vicinity thereof (e.g. as a part of the measuring head 205 or integrated into the mounting device 210). By way of example, the acceleration sensor may be integrated in the upper part of the mounting device 210 which, in FIG. 1, is drawn as a narrower cylindrical part. In particular, the at least one acceleration sensor measures the acceleration in the Y-direction, to be precise repeatedly and, in particular, in each work cycle, and outputs the acceleration measurement values which are then transferred to the computational device 221. Using this, it is possible to take into account accelerations on account of mechanical vibrations which, in particular, are excited by the drives of the columns 202, 203, of the cross slide 207 and/or of the quill 208. However, it is also possible for the at least one acceleration sensor to measure a different component of the acceleration at the measurement location or a plurality of components of the acceleration at the measurement location.

It is preferable that, for the operation of the computational device 221 and hence in the computational model of the CMM 211, the acceleration measurement values and the position measurement values of the position measuring system are measured and provided for the same component (e.g. the component in respect of the Y-direction). In the case of a plurality of components (e.g. in respect of the Y-direction and the X-direction), the measurement values in respect of the same components are once again taken into account in the computational model, both for the acceleration and the position, by virtue of the corresponding deviations being used to generate estimates and being supplied to the model.

A scale of the position measuring system is represented by a plurality of short lines that extend in the vertical direction at the lower end of the crossbeam 204 in FIG. 1. Further scales may extend, in particular, in the vertical direction (Z-direction) along the quill 208 and in the horizontal direction along the longitudinal edges of the measurement table 201 (in the Y-direction). Using assigned position measuring sensors, which are respectively arranged on a part of the CMM 211 and relative to which the scale moves, the position measuring system measures the position of the quill 208, in particular in the Y-direction, X-direction and Z-direction. Which of these measurement values is used for the operation of the computational model depends on the question relating to for which of these directions mechanical vibrations are intended to be ascertained when determining the position by the computational model. The computational model replaces the position measurement value that is obtained directly by the position measuring system with its position estimate for this component or these components or direction or directions.

In particular, the position estimates are used to ascertain the coordinates of the workpiece 217 to be measured in the coordinate system of the CMM 211 from the measurement values of the measuring head 205. By way of example, the position estimates for the predetermined location at the bottom of the quill 208 are used to this end.

Alternatively, or additionally, the position estimates and/or estimates of at least one further state variable (e.g. speed values and/or acceleration values and/or values of a non-physical state variable) may be used for operating the drive controller. By way of example, the position estimates and/or other estimates are repeatedly taken into account, in particular in each work cycle of the drive controller or drive regulator, and control signals for actuating the drives of the CMM 211 are produced therefrom. Therefore, it is possible to damp or compensate mechanical vibrations at the predetermined location using these control signals.

Figure 2:
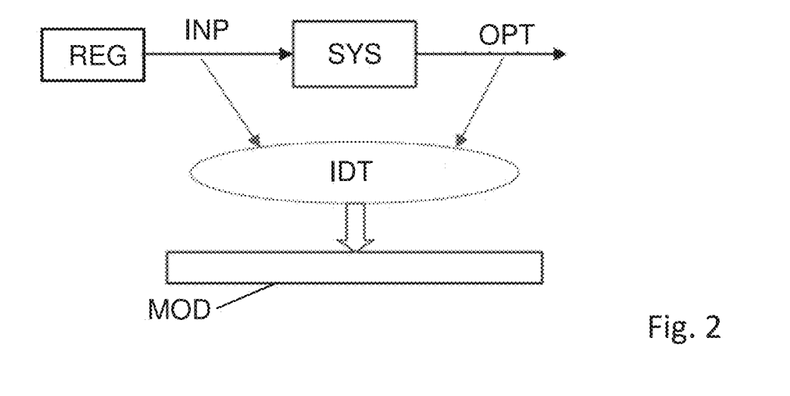

Explanations are now provided with reference to FIG. 2 in relation to how a model, e.g. in the form of an approximated transfer function, may be ascertained for a system SYS, for example the coordinate measuring machine 211 depicted in FIG. 1.

A separately depicted regulator REG, which actuates at least one drive of the system SYS, outputs control signals which are supplied to another part of the regulator REG or directly to at least one drive of the system SYS. These output signals are input signals INP for the system SYS. The system SYS in turn outputs output signals OPT. In relation to the present invention, the input signals INP are the intended values of the drive controller or drive regulator, which are supplied to the computational model. The output signals OPT are at least the position measurement values and/or the acceleration measurement values.

In a method step IDT of identifying the system SYS, the input signals INP and the output signals OPT are processed to form a model MOD of the system SYS. Optionally, additional information may be used for the model MOD besides the input signals INP and the output signals OPT, e.g. information about physical properties of the system SYS.

The computational model that is used for determining the position of the movable part of a coordinate measuring machine by means of position estimates may be, in particular, the model MOD from FIG. 2. However, the invention is not limited thereto. There may be different types of model.

The computational model may use state variables of the system in its calculations, particularly if, like e.g. in the case of the computational model MOD from FIG. 2, input signals INP and output signals OPT are used for defining the model. The state variables may be physical state variables such as the position of the movable part at the predetermined location, the corresponding speed of the movable part and the corresponding acceleration of the movable part, in particular at the measurement location of the at least one acceleration sensor. However, alternatively or additionally, these may be purely mathematical state variables without a defined physical meaning. In particular, the totality of the state variables may be described by a state vector, the components of which are the individual state variables. Such a state vector can be processed by the computational model in a manner which can be described by multiplication of the state vector by an operation matrix.

Therefore, phrased in general terms, the computational model may be a purely mathematical model or a mathematical model with at least partial physical meaning. The computational model may also be a purely physical model, in which the behaviour of the system in respect of mechanical vibrations is described, for example by appropriate differential equations which, for example, describe spring-mass interactions in accordance with the system. In this case, the implemented form of the computational model contains solutions or approximate solutions of the differential equations.

A finite element model (FEM), which uses the masses of the CMM, the damping properties thereof for damping mechanical vibrations and the stiffness properties of the CMM for computational modelling of the CMM, is another form of the physical modelling of the coordinate measuring machine. Such FEMs have already been described in the field of coordinate metrology and are not explained in any more detail here. The FEM implemented in the computational model may, e.g. as a computer program, output matrices and/or vectors which, taking into account the acting excitation forces that lead to mechanical vibrations, describe the system behaviour. A state space model that is suitable for the purposes of the invention may be produced in this way.

The vibration behaviour of a CMM, in particular at the predetermined location for estimating the position by a computational model, may depend on the movement state of the CMM. By way of example, the vibration behaviour in the case of a maximally extended horizontal arm may be different the case in which a horizontal arm is extended less far. In the case of a CMM with a portal design, the vibration behaviour generally also depends on the movement position in respect of each of the three linear axes X, Y and Z. In particular, the X-direction position of the slide (reference sign 207 in FIG. 1) that can move along the crossbeam (reference sign 204 in FIG. 1) is relevant for the vibration behaviour at the lower end of the quill (reference sign 208 in FIG. 1). A corresponding statement applies to the Z-position of the quill, which is also important for the vibration behaviour.

The computational model may also take into account, in the model, the positional dependence of the vibration behaviour in respect of at least one linear axis and/or rotational axis of the CMM. However, the computational model is robust against positional changes in any case on account of the feedback of the position deviations and the acceleration deviations to the computational model. A different vibration behaviour, e.g. a different vibration frequency or different vibration amplitude, is captured by the measurement signals of the acceleration sensor and said different vibration behaviour is therefore available to the model in the form of the acceleration deviations.

Alternatively, or additionally, the dependence of the vibration behaviour of the system at the position of the movable part may also be taken into account by parameters of the model which have different values depending on the position of the movable part. Further, it is alternatively or additionally possible to respectively ascertain a dedicated model for various positions of the movable part and use the model respectively defined for the position during the operation of the CMM. It is possible to define spatial sectors for the position of the movable part in order to restrict the number of models to a practical maximum number, with an assigned computational model being used for each of the spatial sectors. The associated model is used if the predetermined location, in particular, is situated in the spatial sector.

The intended values (input signals INP in the example of FIG. 2) can be values of an analogue variable or digital values. By way of example, this depends on whether the drive controller or the drive regulator produces and outputs analogue or digital values. In the case of digital intended values, the conversion of analogue values into digital values for the digital computational model is dispensed with.

The further description resorts to the exemplary embodiment of a computational model a number of times, in which computational model, as mentioned above, a plurality of state variables describe the respective system state. The state variables are processed, in particular, as components of a state vector in a so-called state space model in order to produce and output estimates for the position at the predetermined location and acceleration, in particular at the measurement location of the acceleration sensor.

As will still be explained in more detail, the computational model can be implemented based on the principle of an observer or a Kalman filter. The computational operations of the computational model are repeatedly carried out, in particular with the system clock of the controller of the CMM, in particular a real-time controller. In particular, a set of input values (intended value, acceleration deviation value and position deviation value) is received and a position estimate and an acceleration estimate are output in each work cycle. The position in the work cycle of the computational model at which the values for the position deviation and the acceleration deviation are supplied depends on the embodiment either as an observer or as a Kalman filter.

As already mentioned, the temporal averages of the estimated position and the position measured by the position measuring system do not deviate from one another or merely deviate by a constant over several vibration cycles of the mechanical vibrations. It is preferable that this behaviour is ensured by setting the weighting of the positional deviation that is fed back to the computational model and that, to the extent that this is applicable, only a deviation that is constant in time remains, said deviation being traced back to a distance between the predetermined location and the position measurement location in the non-vibrating state of the machine. Further, it is preferable that the weighting of the acceleration deviation values that are fed back into the computational model is set in such a way that the temporal profile of the estimated position of the predetermined location, as ascertained by the computational model, follows the vibration profile emerging from the acceleration measurement values over a few (e.g. three or five) vibration cycles, wherein, however, a phase offset may occur between the time profile of the acceleration measurement values and the estimated acceleration values on account of the phase measurement error of the acceleration sensor.

An exemplary embodiment for a computational model that is based on an observer is initially described below with reference to FIG. 3. Like in FIG. 2, the system is also presented schematically in FIG. 3 by a rectangular frame that is denoted by SYS. Intended values DAC of the drive controller or drive regulator are supplied both to the system SYS and the computational model MOD. The supply and processing of values is effectuated, in particular, in the system work cycle of the CMM. Output variables of the system are the position s of the movable part, said positions being created in the form of position measurement values of the position measuring system of the CMM, and the acceleration a at the measurement location of the acceleration sensor, said accelerations being present in the form of acceleration measurement values. Estimates, namely acceleration estimates a and position estimates ŝ, are output of the computational model MOD. The deviation between the respective currently measured position value s and the respectively current position estimate ŝ is ascertained by a first ascertainment device 31 and the resultant deviation Δs is fed back to the computational model MOD. A second ascertainment device 32 respectively ascertains the deviation of the current acceleration measurement value a and the current acceleration estimate â and feeds back the corresponding acceleration deviation value Δa to the computational model MOD.

Here, the position deviation Δs is multiplied by a weighting operator H1 (e.g. a scalar, a vector or a matrix). In the case of a vector or a matrix, the components of this first weighting operator H1 are weighting components in respect of, in each case, one state variable of a state vector or state space, which describes the state of the system SYS. In particular, the weighting components can be temporally constant weighting components, i.e. they do not change over time. The state variables can be both physical state variables and mathematical state variables. By way of example, the computational model MOD uses the physical state variables of position at the predetermined location, acceleration at the measurement location of the acceleration sensor and, optionally, also the speed at the predetermined location, which can be ascertained, for example, by differentiating the position with respect to time and/or integrating the acceleration with respect to time. A corresponding statement like for the first weighting operator H1 also applies to a second weighting operator H2, with which the acceleration deviation Δa is weighted and by means of which, for example by way of different weighting components, it is possible to undertake weightings in relation to the various state variables. Weighting components of the first weighting operator H1 and of the second weighting operator H2 may have the value zero, i.e. no influence of the respective deviation is exerted in respect of individual state variables.

Optionally, e.g. three, four or five purely mathematical state variables may be added in the exemplary embodiment in addition to the physical state variables in order to be able to better describe the behaviour of the system SYS.

The deviations Δs and Δa weighted thus are supplied to the computational model MOD via a combination device 34. Moreover, the intended value DAC of the drive controller or drive regulator is supplied to the combination device 34, weighted by multiplication with a weighting operator B (e.g. a scalar, vector or a matrix) in the exemplary embodiment. In particular, the weighting operator B corresponds to the control vector of the state space model. Optionally, like the weighting operators H as well, the weighting operator B may comprise a multiplicity of weighting components which set the influence of the respectively currently valid intended value to various state variables of the model. If the weighting operator B is a scalar, no influences on various state variables are caused at this point of the model.

Reference sign 33 denotes a retardation member. Such a retardation member is known from control engineering for representing controls and symbolically represents the behaviour corresponding to the clocked processing of the data. In the case of FIG. 3, this means that the input values of the computational model MOD, which are produced from the intended values DAC, the position deviation Δs and the acceleration deviation Δa, are only of importance in the next work cycle. This follows from the actual computational operation of the model being represented by the matrix A at the bottom of FIG. 3 and the result of the computational operations of the model in each work cycle likewise being supplied to the combination device 34. Accordingly, these actual computational operations use the values supplied to the model from the preceding work cycle. Further, as represented by an operation with the matrix C (alternatively a vector), in each work cycle the result of the calculation after combination by the combination device 34 with a delay of one work cycle is output. As already mentioned, the position estimate ŝ and the acceleration estimate â are output.

Since in particular the parameters of the feedback coefficients, which define the vectors, scalars or matrices H1 and H2, may be a large number of parameters (e.g. a total of 5 to 30), it is preferable for the parameter values to be ascertained in advance, i.e. before the operation of the coordinate measuring machine, using a quality criterion. In particular, a test operation of the coordinate measuring machine may take place to this end. In the following equation:

$$J = J_0 + \int_0^\infty x'Qx\,dt + \int_0^\infty u'Ru\,dt = \text{Min}$$

J denotes the result of the calculation within the scope of the quality criterion, $J_0$ denotes a predeterminable fixed value (which may be selected to be zero in many exemplary embodiments), x denotes the state vector which is formed from the values of the state variables as components of the vector and which is determinable by the matrices, vectors or scalars A and C of the state space model, x' denotes the corresponding transposed state vector in order to form a scalar variable from the state vector by matrix multiplication, Q denotes a matrix which allows adjustment of the degree with which trust is placed on the measurement values or, in contrast thereto, on the model, as a result of which it is possible to set the dynamics, in accordance with which the influences of the measurement values decay, u denotes a vector:

$$u = -Hx$$

which is formed from the respective intended value DAC and moreover contains the parameters of the sought-after matrix, the sought-after vector or the sought-after scalar H (consisting of the two columns formed by the vectors $H_1$ and $H_2$ e.g. in the case of a matrix) as coefficients in particular, u' denotes the corresponding transposed vector in order to obtain a scalar variable by multiplication with the matrix R, which renders it possible to set the speed with which the influences on the measurement values decay. By way of example, the program Matlab can be used to implement the computational model and/or calculate the parameters.

Figure 4:
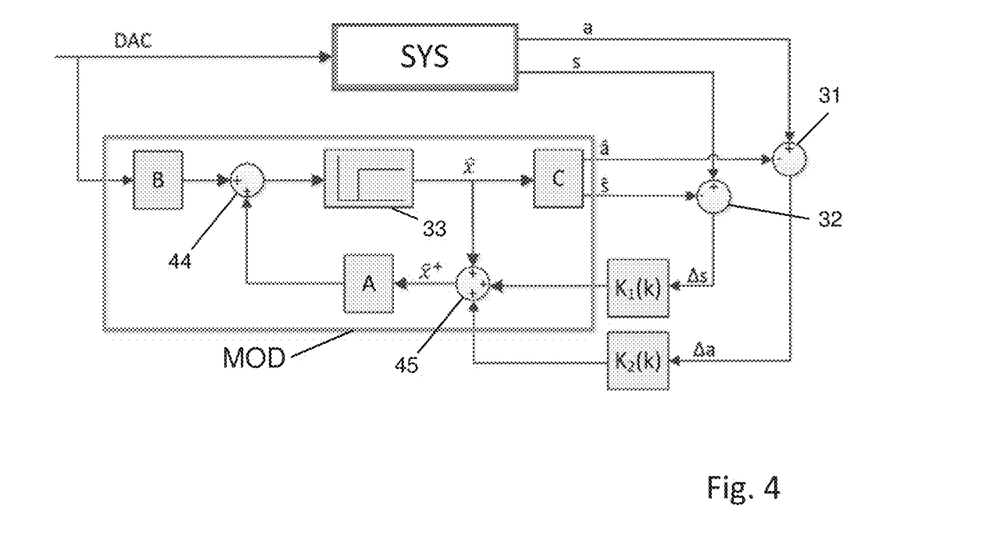

In the further part of the description, FIG. 4 is used to describe another computational model that is based on a Kalman filter. A quality criterion that is similar to what is described by the above equations may be used for setting the parameters of the Kalman filter or of the model in accordance with FIG. 4. However, the matrix R in this case has a deviating meaning from the case of the model based on the observer. In the case of the Kalman filter, values of the matrix R are used to set the degree with which the measurement values are afflicted by noise, i.e. comprise random or quasi-random variations which, for example, are produced by analogue sensors (acceleration sensor and sensors of the position measuring system).

The expression Min in the equation above expresses that the result J of the calculation of the quality criterion is minimized by varying the parameters contained in the matrix, the vector or the scalar H. When the minimum or a minimum has been found, the corresponding set of parameter values is adopted in the computational model and used during the operation of the coordinate measuring machine.

Figure 3:
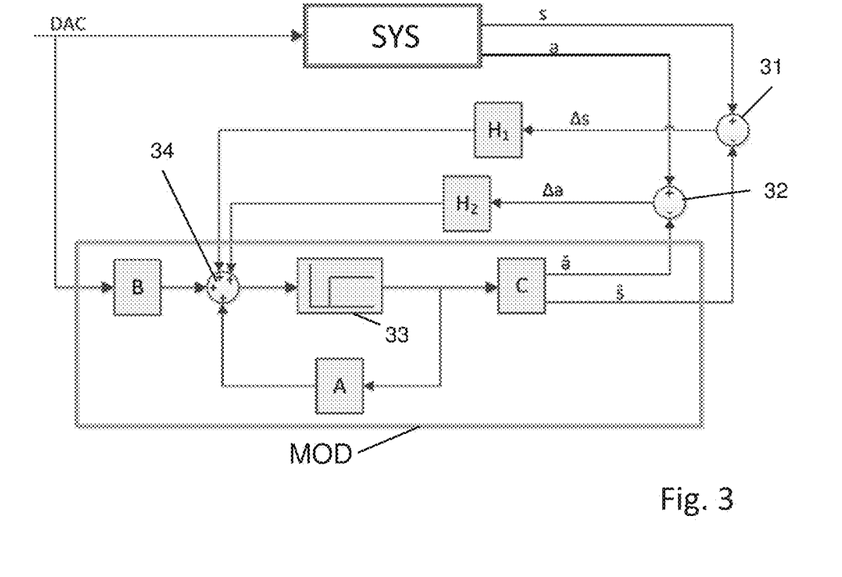

FIG. 4 shows an illustration corresponding to FIG. 3, in which, however, the computational model MOD is based on a Kalman filter. The same symbols are used in respect of the measurement variables and estimated variables, and also in view of the intended values. The ascertainment devices 31, 32 also have the same function as in the case of FIG. 3 and are denoted by the same reference signs as in FIG. 3. However, the combination device at the input of the retardation member 33 in FIG. 4 is denoted by reference sign 44 since it only combines the results of the actual model calculation (once again symbolized by the matrix A) and the intended value DAC that has been weighted by the operator B.

In contrast to FIG. 3, a further combination device 45 still is present, said combination device combining the state vector 2 at the end of the work cycle with the weighted position deviation Δs and the weighted acceleration deviation Δa. A modified state vector $\hat{x}^+$ arises as output variable of the second combination device 45. In accordance with the principle of a Kalman filter, the weighting is effectuated by operators that are not constant in time, e.g. vectors which are denoted by the symbol $K_1(k)$ in relation to the weighting of the position deviation Δs in FIG. 4 and by the symbol $K_2(k)$ in relation to the acceleration weighting Δa. Once again, this may relate to a vector which has weighting components which set the influence of the respective deviation on an assigned state variable. The weighted deviations are therefore supplied at the start of the work cycle and the resultant modified state vector $\hat{x}^+$ is used for carrying out the model calculations within the work cycle, as depicted in FIG. 4. This modified state vector is available at the input of the operator A (e.g. a matrix).

The calculation of the parameters of the computational model MOD is carried out e.g. using the following equations which lead to a modification or correction of the state variables in the current cycle. In principle, the Kalman filter reacts more quickly to the deviations that are fed back than the observer in accordance with FIG. 3:

$$P_n = AP_{n-1}^+ A' + Q$$

$$K_n = P_n C'(CP_n C' + R)^{-1}$$

$$P_n^+ = (E - K_n C)P_n$$

$$\hat{x}_n = A\hat{x}_{n-1} + Bu_n$$

$$\hat{y}_n = C\hat{x}_{n-1}$$

$$\hat{x}_n^+ = K_n(y_{mess} - \hat{y}_n)$$

Here, $P_n$ denotes the result of the operation in the respective work cycle n, which is presented on the right-hand side of the first line of the set of equations and which corresponds to the covariance matrix which reproduces the uncertainty of the estimation, A denotes the matrix A from FIG. 4, which may be referred to as system matrix, $P_{n-1}^+$ denotes the covariance matrix from the preceding work cycle or a predetermined matrix in the first work cycle (said predetermined matrix defining the initial values of the state variables, wherein these may respectively be set to the value of zero in the case of unknown initial values), Q denotes the matrix which defines the dynamics of the computational model in a manner analogous to the quality criterion of the observer, A' denotes the transposed system matrix A, $K_n$ denotes the result of the operation on the right-hand side of the second equation of the set of equations, which is referred to as Kalman gain, C denotes the model matrix from FIG. 4, which, applied to the state vector_$\hat{x}$, produces the estimates for the position and the acceleration, C' denotes the transposed model matrix C, R denotes a matrix which describes the noise of the measurement values, $P_n^+$ denotes the updated covariance matrix in the current cycle, E denotes an identity matrix, i.e. a matrix which respectively has the number 1 along its main diagonal and the remaining values of which are zero, $\hat{x}_{n-1}$ denotes the state vector from the preceding work cycle, initial values of said state variables being set for this for the first work cycle, B denotes the operator which is presented in FIG. 4, $u_n$ denotes the vector which is formed by the current intended values DAC of the drive controller or drive regulator and which may be a scalar or, for example, only one component of said vector is unequal to zero, $\hat{y}_n$ denotes the result of the operation in the fifth equation of the set of equations presented above, $\hat{x}_n^+$ denotes the result of the operation on the right-hand side of the sixth and last equation of the above set of equations and $y_{mess}$ denotes a vector, the components of which are formed by the measurement values for the measurement position s and the measured acceleration a. Here, the matrix $K_n$ is a matrix from which both the operator $K_1(k)$ and the operator $K_2(k)$ are formed or both said operators consist of said matrix. By way of example, the two operators are matrices which are composed to a larger matrix $K_n$ consisting of more lines and columns.

As a result of the described type of cycle-dependent feedback of the position deviation values and the acceleration deviation values in the Kalman filter, a computational model that reacts more quickly than the observer is obtained, said computational model consequently also being more robust in relation to the position dependence of the vibration behaviour of the movable part of the CMM. Using the model that is based on the Kalman filter, it is also possible to better compensate inaccuracies when creating the computational model; i.e., the behaviour of the system is modelled better despite the inaccuracies of the computational model.

The at least one acceleration sensor can be e.g. a sensor which is based on the measurement principle of a piezoelectric sensor. If forces act on the crystal of the sensor, a corresponding separation of charge of positively charged and negatively charged particles is effectuated, said separation being able to be measured e.g. as an electric voltage. However, the crystal or, in the case of a plurality of crystals, the crystals does not or do not have a constant electric voltage in the case of a constant acceleration since the charge separation is increasingly reverted over time. However, other acceleration sensors also produce acceleration measurement values that are afflicted by errors. Feeding back both the position deviation and the acceleration deviation is a measure which leads to suitable computational modelling of the vibration behaviour despite the measurement error.

By way of example, a MEMS (micro-electromechanical system) sensor that measures capacitively may be used as an acceleration sensor. Processing the measurement values of such sensors is afflicted by errors because, in particular, interferences occur on account of external influences, said interferences leading to changes in the measurement signal or errors during the transmission of the measurement signal. Nevertheless, capacitively measuring MEMS sensors are preferred for the purposes of the present invention.

In addition to the mechanical vibrations of the movable part, which are caused by the drives of the CMM, there may also be vibrations on account of different causes, said vibrations also relating to the base (e.g. a granite slab) of the CMM. If the base vibrates as well, this may have direct effects on the measurement results of the acceleration sensor at the movable part. For this case, it is proposed that at least one additional acceleration sensor is arranged at the base of the CMM. In this case, instead of using the measurement signal of the at least one acceleration sensor at the measurement location of the movable part, it is possible to use the difference of the measurement signals of the at least one acceleration sensor at the movable part and of the at least one acceleration sensor at the base. As a result, the effects of the mechanical vibration of the base are eliminated.

Figure 5:
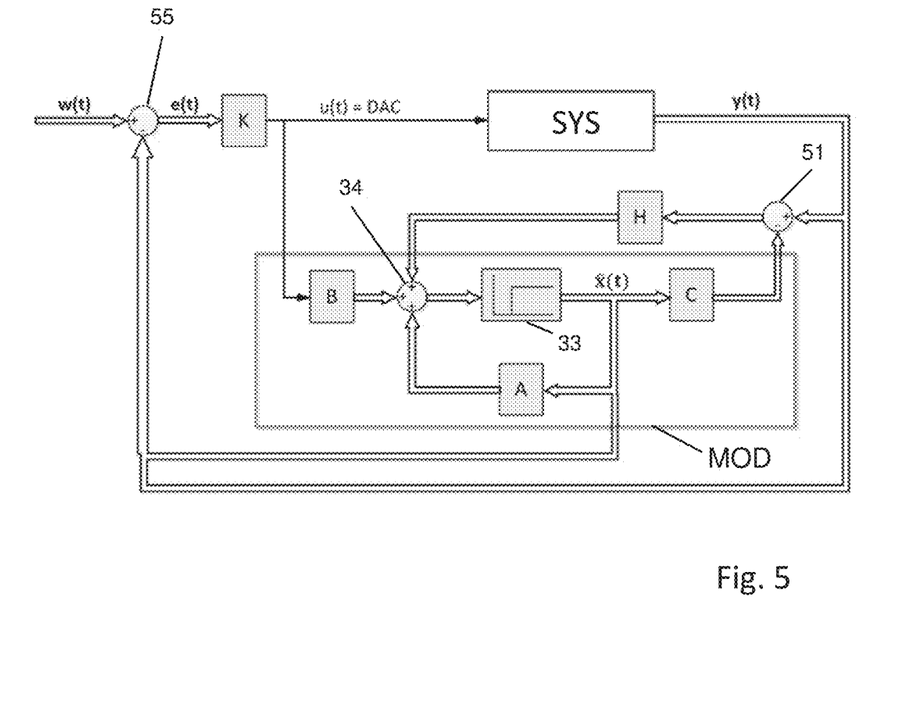

Now, an exemplary embodiment for taking into account the position at the predetermined location of the movable part for the drives of the CMM, as estimated by the computational model, is described on the basis of FIG. 5. In particular, this may be used for damping the vibrations that are caused by the drives. However, particularly in the case of the Kalman filter, it is even possible to obtain a comprehensive compensation of the mechanical vibrations, i.e. the control signals of the drive controller or drive regulator that are produced taking into account the estimated position lead to a significantly reduced vibration amplitude already at the start of a mechanical vibration of the movable part that is excited by the drives when compared to the case in which the position that is estimated by the computational model is not taken into account for actuating the drives or the at least one drive.

FIG. 5 contains a similar illustration to the case of FIG. 3, i.e. the computational model is based on an observer. Alternatively, use could be made of a computational model that is based on a Kalman filter. Further, the illustration in FIG. 5 is simplified in relation to the illustration in FIG. 3 in respect of the operators H, which produce appropriately weighted influencing variables for the computational model MOD from the position deviations and the acceleration deviations. These operators are denoted by the symbol H in FIG. 5 in a combined manner. The two ascertainment devices 31, 32 from FIG. 3 are depicted in a combined manner in FIG. 5 by a single ascertainment device 51. However, the function of these ascertainment devices and of the operators H does not differ from the case in FIG. 3.

Further, the measured position s and acceleration a at the output of the system SYS are presented in FIG. 5 as a vector y(t) that is dependent on time t. Both the current values of the vector y and the current estimated state vector $\hat{x}(t)$ that is produced by the computational model MOD are supplied to a combination device 55, the latter also being supplied with a time-dependent reference variable w(t). Here, the state vector, which is output by the computational model MOD, may also contain further state variables, e.g. purely mathematical and/or further physical state variables and/or the speed of the movable part at the predetermined location, besides the physical state variables of position $\hat{s}$ and acceleration $\hat{a}$. From the aforementioned supplied values, the combination device 55 produces a regulating error e(t) as an output variable, to which an operator K (e.g. a vector) is applied. A weighting can be undertaken by way of the operator K. The intended value variable u(t) emerges therefrom, said intended value variable possibly being the same intended value variable as in the cases of FIG. 3 and FIG. 4. This is indicated by the additional use of the label DAC. Like in the above-described cases as well, this may relate here to e.g. the intended rotational speed, the intended speed, the intended current or the control voltage of at least one drive of the CMM.

Alternatively, feeding back the measurement vector y(t) or a corresponding scalar, the latter in the case of only one feedback measurement variable, and the estimated state vector $\hat{x}(t)$ can be carried out in such a way that, for each state variable, only one of the two feedback vectors or scalars contains a value unequal to 0. As a result of this, there is a clear definition as to which of the two feedback vectors or scalars has an influence on the drive regulation in respect of this state variable. However, nor is it necessary for a value to be fed back to the combination device 55 for all state variables that are taken into account by the computational model MOD. What set of feedback state variables achieves the best damping or compensation of vibrations can be ascertained within a test operation or simulation, in particular by varying the set of the state variables that are fed back to the combination device 55.

What can be achieved, in particular, on account of the function of the combination device 55 is that each defined state variable that is to be fed back (e.g. the acceleration and the position) is contained only as a single state variable in the regulating error e(t) despite the feedback of both the measurement vector y(t) and the estimated state vector $\hat{x}(t)$. Here, the vector or scalar w(t) only has the dimension of the number of defined feedback state variables. What can be achieved by filling the reference variable w(t) with a zero in the component corresponding to a state variable, particularly if the combination device 55 forms the difference between the reference variable w(t) and the feedback vector, to be precise component-by-component for each state variable, is that the negative value of the corresponding state variable is directly assigned to the corresponding element of the regulating error e(t), i.e. a difference is formed, in which the corresponding component of the vector w(t) has a value of zero. Here, it is also possible for a component of the vector of the reference variable w(t) to permanently have a value of zero.

The parameters of the model are defined by the respective above-described method of model formation. The values of the operator K may be ascertained in advance, in a manner analogous to what is described above in the case of the observer. Here, it is optionally possible to proceed in two steps. Initially, the observer or the Kalman filter can be designed as described above and the corresponding parameters H can be ascertained. Then, the parameters of the operator K can be ascertained in a second step by renewed application of a quality criterion. Like in the case of the quality criterion, the application of which was described in conjunction with FIG. 3 and FIG. 4, it is also possible for a plurality of elements, or even the vast majority of elements, of the matrices R and Q to be occupied with a value of 0. This simplifies the application of the quality criterion. By way of example, it is possible to ascertain the occupancy of the matrices Q and R which leads to the best result using matrices which are differently occupied with the zero values in various applications of the quality criterion. A further option for arriving quickly and reliably at suitable parameter values for the operators in FIG. 5 lies in the already mentioned non-consideration of at least one state variable within the scope of the feedback, i.e. this state variable or these state variables are not fed back to the combination device 55.

The invention claimed is:

1. A method for determining a position of a movable part of a coordinate measuring machine when measuring the coordinates of a workpiece, wherein a measuring sensor of the coordinate measuring machine is moved by way of a movement of the movable part, the method comprising:
  supplying intended values that are produced by a drive controller of the coordinate measuring machine to a computational model of the coordinate measuring machine, wherein the drive controller actuates at least one drive of the coordinate measuring machine in order to move the movable part of the coordinate measuring machine and hence move the measuring sensor, and wherein the intended values predetermine an intended state of the at least one drive,
  measuring position values of the movable part by a position measuring system of the coordinate measuring machine,
  forming position deviations between the measured position values and position estimates of the computational model, wherein the position estimates are produced by the computational model for a predetermined location associated with the movable part,
  measuring acceleration values by an acceleration sensor which is arranged at an acceleration measurement location, which is a location associated with the movable part, wherein the acceleration measurement location is at a distance from a position measurement location of the position measuring system in possible movement positions of the movable part, and in the possible movement positions of the movable part, lies closer to the predetermined location than the position measurement location of the position measuring system at which the position measuring system measures the position values of the movable part, and
  forming acceleration deviations between the measured acceleration values and acceleration estimates of the computational model,
  wherein the position deviations and the acceleration deviations are supplied to the computational model and, taking these into account, the computational model outputs updated position estimates and updated acceleration estimates, and wherein the position of the movable part is determined by the updated position estimates.

2. The method of claim 1, wherein coordinates of the workpiece that is measured using the measuring sensor are ascertained from at least one of the updated position estimates and updated acceleration estimates.

3. The method of claim 2, wherein the updated position estimates and estimates of the computational model which are values of at least one further state variable are supplied to the drive controller of the coordinate measuring machine and used by the drive controller when producing control signals for actuating the at least one drive.

4. The method of claim 2, wherein the intended values, the position deviations and the acceleration deviations are supplied to the computational model with a weighting (H) in each case such that there is a greater influence in the case of a higher set weighting (H) and a lesser influence in the case of a lower set weighting (H) on calculations of the computational model, and wherein the weighting (H) is ascertained based on a quality criterion which takes into account state variables, which describe the state of the coordinate measuring machine, and the intended values produced by the drive controller, respectively over the course of time during an operating time period.

5. The method of claim 1, wherein at least one of the updated position estimates and estimates of the computational model which are values of at least one further state variable are supplied to the drive controller of the coordinate measuring machine and used by the drive controller when producing control signals for actuating the at least one drive.

6. The method of claim 5, wherein the intended values, the position deviations and the acceleration deviations are supplied to the computational model with a weighting (H) in each case such that there is a greater influence in the case of a higher set weighting (H) and a lesser influence in the case of a lower set weighting (H) on calculations of the computational model, and wherein the weighting (H) is ascertained based on a quality criterion which takes into account state variables, which describe the state of the coordinate measuring machine, and the intended values produced by the drive controller, respectively over the course of time during an operating time period.

7. The method of claim 1, wherein at least one of the intended values, the position deviations and the acceleration deviations are supplied to the computational model with a weighting (H) in each case such that there is a greater influence in the case of a higher set weighting (H) and a lesser influence in the case of a lower set weighting (H) on calculations of the computational model, and wherein the weighting (H) is ascertained based on a quality criterion which takes into account state variables, which describe the state of the coordinate measuring machine, and the intended values produced by the drive controller, respectively over the course of time during an operating time period.

8. A coordinate measuring machine comprising:
  a movable part;
  a measuring sensor connected to the movable part and configured to measure coordinates of a workpiece;
  a drive configured to drive the movable part based on intended values that determine an intended state of the drive;
  a drive controller configured to actuate the drive by generating the intended values;

a position measuring system configured to measure position values of the movable part at a position measurement location;

a computational device with a computational model configured to:

based on the intended values from the drive controller, use the computational model to produce position estimates for a predetermined location associated with the movable part, and determine position deviations between the measured position values and the position estimates; and an acceleration sensor arranged at an acceleration measurement location and configured to measure acceleration values, wherein the acceleration measurement location is associated with the movable part, wherein the acceleration measurement location is spaced apart from the position measurement location, wherein, for most of the possible movement positions of the movable part, the acceleration measurement location is closer to the predetermined location than is the position measurement location, and wherein the computational device is configured to:

produce acceleration estimates for the movable part using the computational model, determine acceleration deviations between the measured acceleration values and the acceleration estimates, during operation of the coordinate measuring machine, use the computational model to generate updated position estimates based on the position deviations and the acceleration deviations, and determine the position of the movable part based on the updated position estimates.

9. The coordinate measuring machine of claim 8, wherein:

the coordinate measuring machine is configured to, during operation, supply at least one of the updated position estimates and estimates of the computational model (MOD) which are values of at least one further state variable to the drive controller, and the drive controller is configured to produce control signals for actuating the drive based on at least one of the updated position estimates and estimates of the computational model (MOD) which are values of at least one further state variable.

10. The coordinate measuring machine of claim 9, wherein the coordinate measuring machine is configured to supply the intended values, the position deviations and the acceleration deviations to the computational model with a weighting in each case such that there is a greater influence in the case of a higher set weighting and a lesser influence in the case of a lower set weighting on calculations of the computational model.

11. The coordinate measuring machine of claim 8, wherein the coordinate measuring machine is configured to supply the intended values, the position deviations and the acceleration deviations to the computational model with a weighting in each case such that there is a greater influence in the case of a higher set weighting and a lesser influence in the case of a lower set weighting on calculations of the computational model.

12. The coordinate measuring machine of claim 8, wherein the coordinate measuring machine is configured to supply the intended values, the position deviations or the acceleration deviations to the computational model with a weighting in each case such that there is a greater influence in the case of a higher set weighting and a lesser influence in the case of a lower set weighting on calculations of the computational model.

13. The coordinate measuring machine of claim 8, wherein the coordinate measuring machine is configured to ascertain coordinates of the workpiece based on the updated position estimates.

14. The coordinate measuring machine of claim 8, wherein the computational device is configured to, during operation of the coordinate measuring machine, use the computational model to generate updated acceleration estimates based on the position deviations and the acceleration deviations.

* * * * *